United States Patent Office 3,251,899
Patented May 17, 1966

3,251,899
PROCESS FOR THE DEHYDROGENATION
OF OLEFINS
James L. Callahan, Bedford, Ohio, Berthold Gertisser, New York, N.Y., and Robert Grasselli, Cleveland, Ohio, assignors to The Standard Oil Company, Cleveland, Ohio, a corporation of Ohio
No Drawing. Filed June 11, 1962, Ser. No. 201,279
6 Claims. (Cl. 260—680)

This invention relates to the catalytic oxidative dehydrogenation of olefins to diolefins, such as butene-1 to butadiene, and tertiary amylenes to isoprene, using an improved oxidation catalyst consisting essentially of oxides of the elements antimony and uranium.

U.S. Patent No. 2,904,580 dated September 15, 1959, describes a catalyst composed of antimony oxide and molybdenum oxide, as antimony molybdate, and indicates its utility in converting propylene to acrylonitrile.

British Patent 864,666 published April 6, 1961, describes a catalyst composed of an antimony oxide alone or in combination with a molybdenum oxide, a tungsten oxide, a tellurium oxide, a copper oxide, a titanium oxide, or a cobalt oxide. These catalysts are said to be either mixtures of these oxides or oxygen-containing compounds of antimony with the other metal; such as antimony molybdate or molybdenum antimonate. These catalyst systems are said to be useful in the production of unsaturated aldehydes such as acrolein or methacrolein from olefins such as propylene or isobutene and oxygen.

British Patent 876,446 published August 30, 1961, describes catalysts including antimony, oxygen and tin, and said to be either mixtures of antimony oxides with tin oxides, or oxygen-containing compounds of antimony and tin such as tin antimonate. These catalysts are said to be useful in the production of unsaturated aliphatic nitriles such as acrylonitrile from olefins such as propylene, oxygen and ammonia.

I. THE CATALYST

In accordance with the invention, an oxidation catalyst is provided consisting essentially of oxides of antimony and uranium. This catalyst is useful not only in the oxidation of olefins to oxygenated hydrocarbons such as acrolein and the oxidation of olefin-ammonia mixtures to unsaturated nitriles such as acrylonitrile, but also in the catalytic oxidative dehydrogenation of olefins to diolefins.

The nature of the chemical compounds which compose the catalyst of the invention is not known. The catalyst may be a mixture of antimony oxide or oxides and uranium oxide or oxides. It is also possible that the antimony and uranium are combined with the oxygen to form an antimonate or uranate. X-ray examination of the catalyst system has indicated the presence of a structurally common phase of the antimony type, composed of antimony oxide, and some form of uranium oxide. Antimony tetroxide has been identified as present. For the purposes of description of the invention, this catalyst system will be referred to as a mixture of antimony and uranium oxides, but this is not to be construed as meaning that the catalyst is composed either in whole or in part of these compounds.

The proportions of antimony and uranium in the catalyst system may vary widely. The Sb:U atomic ratio can range from about 1:50 to about 99:1. However, optimum activity appears to be obtained at Sb:U atomic ratios within the range from 1:1 to 25:1.

The catalyst can be employed without support, and will display excellent activity. It also can be combined with a support, and preferably at least 10% up to about 90% of the supporting compound by weight of the entire composition is employed in this event. Any known support materials can be used, such, for example, silica, alumina, zirconia, alundum, silicon carbide, alumina-silica, and the inorganic phosphates, silicates, aluminates, borates and carbonates stable under the reaction conditions to be encountered in the use of the catalyst.

The antimony oxide and uranium oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, meta-antimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid such as nitric acid.

The uranium oxide component can be provided in the form of uranium oxide or by precipitation in situ from a soluble uranium salt such as the nitrate, acetate, or a halide such as the chloride. Uranium metal can be used as a starting material, and if antimony metal is also employed, the antimony can be converted to the oxide and uranium to the nitrate simultaneously by oxidation in hot nitric acid. A slurry of hydrous antimony oxide formed in situ from the metal in nitric acid also can be combined with a solution of a uranium salt such as uranium nitrate, which is then precipitated in situ as uranium oxide by the addition of ammonium hydroxide. The ammonium nitrate and any other soluble salts are removed by filtration of the resulting slurry.

It will be apparent from the above that uranium tribromide, uranium tetrabromide, uranium trichloride, uranium tetrachloride, uranium pentachloride, uranium hexafluoride, uranium tetraiodide, uranyl nitrate, uranyl sulfate, uranyl chloride, uranyl bromide, uranium trioxide, and uranium peroxide can be employed as the source of the uranium oxide component.

The catalytic activity of the system is enhanced by heating at an elevated temperature. Preferably, the catalyst mixture is dried and heated at a temperature of from about 500 to about 1150° F., preferably at about 700 to 900° F., for from two to twenty-four hours. If activity then is not sufficient, the catalyst can be further heated at a temperature above about 1000° F., but below a temperature deleterious to the catalyst at which it is melted or decomposed, preferably from about 1400° F. to about 1900° F. for from one to forty-eight hours, in the presence of air or oxygen. Usually this limit is not reached before 2000° F. and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-uranium oxide catalyst composition of the invention can be defined by the following empirical formula:

$$Sb_aU_bO_c$$

where $a$ is 1 to 99, $b$ is 50 to 1, and $c$ is a number taken to saitsfy the average valences of antimony and uranium in the oxidation states in which they exist in the catalyst as defined by the empirical formula above. Thus, the Sb valence may range from 3 to 5 and the U valence from 4 to 6.

II. THE OXIDATIVE DEHYDROGENATION OF OLEFINS TO DIOLEFINS AND AROMATICS

In accordance with the present invention, this catalyst system is employed in the catalytic oxidative dehydrogenation of olefins to diolefins and aromatics. In this process, the feed stream in vapor form containing the olefin to be dehydrogenated and oxygen is conducted over the catalyst at a comparatively low temperature to obtain the corresponding diolefin or aromatic compound.

By the term "olefin" as used herein is meant the open chain as well as cyclic olefins. The olefins dehydrogenated in accordance with the invention have at least four and up to about eight nonquaternary carbon atoms, of which at least four are arranged in a series in a straight chain or ring. This definition excludes isobutylene. The olefins preferably are either normal straight chain or tertiary olefins. Both cis and trans isomers, where they exist, can be dehydrogenated.

Among the many olefinic compounds which can be dehydrogenated in this way are butene-1, butene-2, pentene-1, pentene-2, tertiary pentenes having one tertiary carbon atom such as 2-methyl-pentene-1, 3-methylbutene-1, 2-methyl-butene-2, hexene-1, hexene-2, 4-methyl-pentene-1, 3,4-dimethyl-pentene-1, 4-methyl-pentene-2, heptene-1, octene-1, cyclopentene, cyclohexene, 3-methyl cyclohexene, and cycloheptene.

Open chain olefins yield diolefins, and in general, six-membered ring olefins yield aromatic ring compounds. The higher molecular weight open chain olefins may cyclize to aromatic ring compounds.

The feed stock in addition to the olefin and oxygen can contain one or more paraffinic or naphthenic hydrocarbons having up to about ten carbon atoms, which may be present as impurities in some petroleum hydrocarbon stocks and which may also be dehydrogenated in some cases. Propylene and isobutylene should not be included in substantial amounts.

The amount of oxygen should be within the range from about 0.3 to about 3 moles per mole of olefin. Stoichiometrically, 0.5 to 1.5 moles of oxygen per mole of olefin is required for the dehydrogenation to diolefins and aromatics, respectively. It is preferred to employ an excess, from 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture, such as steam, carbon dioxide, or nitrogen.

The feed stock is preferably catalytically dehydrogenated in the presence of steam, but this is not essential. Usually, from about 0.1 to about 6 moles of steam per mole of olefin reactant is employed, but amounts larger than this can be used.

The dehydrogenation proceeds at temperatures within the range from about 325° C. to about 1000° C. Optimum yields are obtainable at temperatures within the range from about 400 to about 550° C. However, since the reaction is exothermic, temperatures in excess of 550° C. should not be used, unless means is provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range from about 5 to about 75 p.s.i.a. Higher pressures up to about 300 p.s.i.a. can be used and have the advantage of simplifying the product recovery.

Only a brief contact time with the catalyst is required for effective dehydrogenation. The apparent contact time with the catalyst can range from about 0.5 to about 50 seconds but higher contact times can be used if desired. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture. At these contact times, comparatively small reactors and small amounts of catalyst can be used effectively.

The catalyst can be supplied in the form of tablets or pellets suitable for use in a fixed bed, with or without a support, maintained at the reaction temperature, passing the feed vapors through the bed. In this method of operation, the partial pressure of oxygen is high at the inlet and low at the outlet. The concentration of diolefin, on the other hand, is substantially zero at the inlet and at a maximum at the outlet.

The catalyst can also be provided in the form of a "fluidized" bed employing the catalyst in powdered form.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The effluent from the reaction zone can be quenched, but normally this is not required, inasmuch as there is little tendency for side reactions to take place, particularly at the preferred temperature range. The effluent can then be washed with dilute caustic to neutralize any acids present, and remove the steam. If air is used as a source of oxygen, the effluent is then compressed and scrubbed with oil to separate the hydrocarbons from the nitrogen, carbon dioxide and carbon monoxide. The hydrocarbons may then be stripped from the oil, and subjected to an extractive distillation or a copper ammonia acetate treatment to separate and recover the diolefin. Unreacted olefin can be recycled to the reactor.

The following examples in the opinion of the inventors represent preferred embodiments of the process of oxidative dehydrogenation of olefins in accordance with the invention.

Examples 1 to 5

A catalyst system composed of antimony oxides and uranium oxides with an Sb:U atomic ratio of 11.7:1 was prepared as follows. 200 g. of antimony metal (less than 270 mesh) was heated in 826.7 cc. of concentrated nitric acid, until all of the red oxides of nitrogen had been driven off. To this was added a water solution containing 62.9 g. of uranyl acetate $UO_2(C_2H_3O_2)_2 2H_2O$. The slurry was diluted with approximately 400 cc. of water, and then 500 cc. of 28% ammonium hydroxide was added, raising the pH to 8. The slurry was filtered, and washed with three portions of 1350 cc. each of 2.5% ammonium hydroxide solution. Air was drawn through the filter cake for 15 minutes after the last wash. The catalyst was dried overnight in an oven at 130° C., calcined at 800° F. overnight and then activated by heating overnight at 1400° F. in a muffle furnace open to the atmosphere.

The activity of this catalyst in the oxidative dehydrogenation of butene-1 and trans-butene-2 to butadiene was determined using a bench scale reactor having a capacity of approximately 100 ml. of catalyst charge in a fixed bed. The feed gases were metered by rotameters, and water was fed by means of a Sigmamotor pump through capillary copper tubing. In the tests, a catalyst charge of 90 ml. was used. The feed molar ratio of butene/air/nitrogen/water is given in Table I below. The reaction was carried out at the temperature given in the table, and in each case the apparent contact time with the catalyst was ten seconds.

The percent conversions in the table are expressed as:

Percent Total Conversion = 100 ×

$$\frac{\text{moles of olefin fed} - \text{moles of olefin recovered}}{\text{moles of olefin fed}}$$

Percent Conversion to Diolefin = 100 ×

$$\frac{\text{moles of diolefin recovered}}{\text{moles of olefin fed}}$$

TABLE I

| Example No. | Butene | Feed Ratio, Butene/Air/N₂/H₂O Vol. Ratio (Molar) | | | | Temperature, °F. | Percent Conversion Per Pass | |
|---|---|---|---|---|---|---|---|---|
| | | | | | | | Percent Total | Percent Butadiene |
| 1 | Butene-1 | 1 | 3 | 4 | 1 | 920–940 | 44.5 | 35.0 |
| 2 | TransButene-2 | 1 | 4 | 5.4 | 1 | 930 | 40.2 | 23.4 |
| 3 | do | 1 | 7 | 0 | 1 | 910–930 | | 18.4 |
| 4 | do | 1 | 3 | 4 | 1 | 910–930 | | 19.2 |
| 5 | Butene-1 | 1 | 3 | 4 | 1 | 920–955 | | 30.8 |

The unconverted effluent was recycled to the reactor after the butadiene had been separated. It is apparent that quite useful per pass conversions of butene to butadiene were obtained in each run. Only traces of acids and aldehydes were formed.

*Example 6*

A catalyst system composed of antimony oxides and uranium oxides with an Sb:U atomic ratio of 6:1 was prepared in accordance with the following procedure. 45 g. of 150 mesh antimony metal was dissolved in 186 cc. of nitric acid (specific gravity 1.42) by boiling until the evolution of oxides of nitrogen had ceased. To this reaction mixture was then added 26.7 of uranyl acetate dissolved in 200 cc. of water. 150 cc. of 28% ammonium hydroxide was added to the mixture, and the reaction slurry was filtered and washed with three 100 cc. portions of wash water containing a small amount of ammonium hydroxide. The catalyst was then dried at 120° C. in an oven overnight, calcined at 800° F. overnight, and activated by heating at 1400° F. for twelve hours in a muffle furnace open to the atmosphere.

The catalyst thus obtained was employed in the dehydrogenation of butene-1 to butadiene, using the same reactor employed in Examples 1 to 5. The feed ratio butene/air/nitrogen/water was 1/3/4/1. The reaction temperature was held at 940–950° F., and the apparent catalyst contact time was 12 seconds. The total conversion was 38.2%, and the conversion to butadiene was 29.2% per pass.

*Example 7*

A catalyst system comprised of antimony oxides and uranium oxides with an Sb:U atomic ratio of 6:1 supported on an equal weight of silica was prepared in accordance with the following procedure. 60.6 g. of the activated catalyst of Example 6 was added with stirring and heating to 198 g. of an aqueous silica sol containing 30 wt. percent SiO₂. The catalyst was then dried in the oven at 130° C. with occasional stirring for three hours, and calcined at 800° F. overnight, and activated by heating at 1400° F. for 12 hours in a muffle furnace open to the atmosphere.

This catalyst was then employed in a 90 ml. charge in the reactor of Examples 1 to 5 for the conversion of transbutene-2 to butadiene. The feed molar ratio/butene/air/nitrogen water was 1/4/5.4/1. The apparent contact time was 10 seconds and the reaction temperature 920 to 940° F. The total conversion was 40.6%, and 30.1% butadiene was formed per pass.

*Example 8*

A catalyst system composed of antimony oxides and uranium oxides, Sb:U atomic ratio of 6:1 supported on one-third its weight of silica was prepared in accordance with the following procedure. 90 g. of 80 mesh antimony metal was dissolved in 360 cc. of hot concentrated nitric acid (specific gravity 1.42) by heating until the evolution of oxides of nitrogen had ceased and the mixture evaporated almost to dryness. To this reaction mixture was then added 53.4 g. of uranyl acetate with stirring. This mixture was ball milled for four hours. In removing the mass from the mill, 200 cc. of water was added and then 194 g. of aqueous silica sol (30.6% SiO₂). With constant stirring, 200 cc. of 28% ammonium hydroxide was added to the mixture in one step, and the slurry was filtered and washed with three 100 cc. portions of wash water. The catalyst was then dried overnight at 120 to 130° C. in an oven, calcined at 800° F. for 20 hours and activated by heating at 1800° F. for 8 hours in a muffle furnace open to the atmosphere.

The catalyst thus obtained was employed in a 90 ml. charge in the dehydrogenation of butene-1 to butadiene, using the same reactor employed in Examples 1 to 5. The feed ratio butene/air/nitrogen/water was 1/6/4/3. The reaction temperature was held at 890–900° F. and the apparent catalyst contact time was 5 seconds. The total conversion was 72.14%, with 64.7% butadiene obtained, per pass. In another run, at 860–880° F., an apparent contact time of 10 seconds, and a feed ratio of butene-1/air/nitrogen/water of 1/6/4/8, the total conversion was 63.5% and the percent conversion to butadiene was 57.6% per pass.

We claim:

1. The process for the oxidative dehydrogenation of olefins to diolefins which comprises contacting a mixture of oxygen and an olefin having at least four up to about eight nonquaternary carbon atoms, of which at least four are arranged in series, in the vapor phase at a temperature at which the oxidative dehydrogenation proceeds with a catalyst consisting essentially of an active catalytic oxide complex of antimony and uranium, the Sb:U atomic ratio being within the range from about 1:50 to about 99:1, said complex being formed by heating the mixed oxides of antimony and uranium in the presence of oxygen at an elevated temperature of about 500° F. but below their melting point for a time sufficient to form said active catalytic oxide complex of antimony and uranium.

2. The process in accordance with claim 1, wherein the catalyst has an Sb:U atomic ratio of from 1:1 to 25:1.

3. The process in accordance with claim 1, in which the reaction is carried out at a temperature within the range from about 325 to about 1000° C.

4. The process in accordance with claim 1, in which the olefin has from about four to about eight carbon atoms in a straight chain.

5. The process in accordance with claim 1, in which the proportion of oxygen in the feed is maintained at from 0.3 to 3 moles per mole of olefin.

6. The process in accordance with claim 1, wherein the olefin is a butene.

References Cited by the Examiner

UNITED STATES PATENTS 1,975,476   10/1934   Pier et al. _____ 252—456

FOREIGN PATENTS 840,519   1/1939   France.
1,248,370   10/1960   France.
1,287,214   1/1962   France.
902,952   8/1962   Great Britain.

PAUL M. COUGHLAN, *Primary Examiner.*
A. D. SULLIVAN, *Examiner.*